United States Patent
Yang et al.

(10) Patent No.: US 7,825,606 B2
(45) Date of Patent: *Nov. 2, 2010

(54) FLUORESCENT LAMP DRIVER POWER

(76) Inventors: Dongping Yang, 6th Floor, 2nd Zhongjian Industrial Building,No. 18, Yanshan Road, Shekou, Shenzhen (CN); Chengcai Gui, 6th Floor, 2nd Zhongjian Industrial Building,No. 18, Yanshan Road, Shekou, Shenzhen (CN); Zhi Zhang, 6th Floor, 2nd Zhongjian Industrial Building,No. 18, Yanshan Road, Shekou, Shenzhen (CN)

( * ) Notice: Subject to any disclaimer, the term of this patent is extended or adjusted under 35 U.S.C. 154(b) by 12 days.

This patent is subject to a terminal disclaimer.

(21) Appl. No.: 11/986,512

(22) Filed: Nov. 20, 2007

(65) Prior Publication Data
US 2008/0246411 A1 Oct. 9, 2008

(30) Foreign Application Priority Data
Apr. 5, 2007 (CN) .................. 2007 1 0073921

(51) Int. Cl.
*H05B 41/16* (2006.01)
(52) U.S. Cl. .................. 315/247; 315/291; 315/209 R; 363/22
(58) Field of Classification Search .......... 315/247, 315/141, 276, 288, 360, 200 R, 206, 209 R, 315/272, 291, 300, 307, 308, 224, 225, 246, 315/282, 283; 363/22, 34, 131; 361/622, 361/623
See application file for complete search history.

(56) References Cited

U.S. PATENT DOCUMENTS

| | | | |
|---|---|---|---|
| 5,416,387 A * | 5/1995 | Cuk et al. ............... | 315/209 R |
| 6,429,598 B1 * | 8/2002 | Haley ..................... | 315/141 |
| 2005/0030767 A1 * | 2/2005 | Phadke et al. ............ | 363/17 |
| 2005/0036339 A1 * | 2/2005 | Zverev et al. ............ | 363/22 |
| 2005/0105305 A1 * | 5/2005 | Sawada et al. ........... | 363/34 |
| 2005/0190583 A1 * | 9/2005 | Morimoto et al. ........ | 363/24 |
| 2007/0114952 A1 * | 5/2007 | Yang ....................... | 315/307 |
| 2008/0018265 A1 * | 1/2008 | Lee et al. ................. | 315/291 |

* cited by examiner

*Primary Examiner*—Douglas W Owens
*Assistant Examiner*—Jae K Kim
(74) *Attorney, Agent, or Firm*—Raymond Y. Chan; David and Raymond Patent Firm (57) ABSTRACT

A kind of fluorescent lamp driver power consists of a multi-switch converting circuit, a power transformer, a resonant inductor, a resonant capacitor, a step-up transformer and a rectifier. The primary winding of the power transformer connects with an AC output of multi-switch converting circuit. The resonant inductor and the resonant capacitor are connect to the secondary winding of the power transformer through the primary winding of the step-up transformer. The secondary winding of the power transformer connects with the rectifier. The secondary winding of the step-up transformer connects with the load output. This invention combines the fluorescent lamp driver power and the power supply of the control system, so that energy transformation occurs only once for the output from the Power Factor Correction Circuit to lamp.

10 Claims, 6 Drawing Sheets

FLUORESCENT LAMP DRIVER POWER

BACKGROUND OF THE PRESENT INVENTION

1. Field of Invention

This invention relates to the electrical field, in particularly to a type of fluorescent lamp driver power.

2. Description of Related Arts

A Liquid Crystal Display (LCD) device generally consists of a backlight module and a liquid crystal panel. The backlight module is used to provide light source for the liquid crystal panel that does not give out light at all, but power supply is required for both of them.

Figure 1:
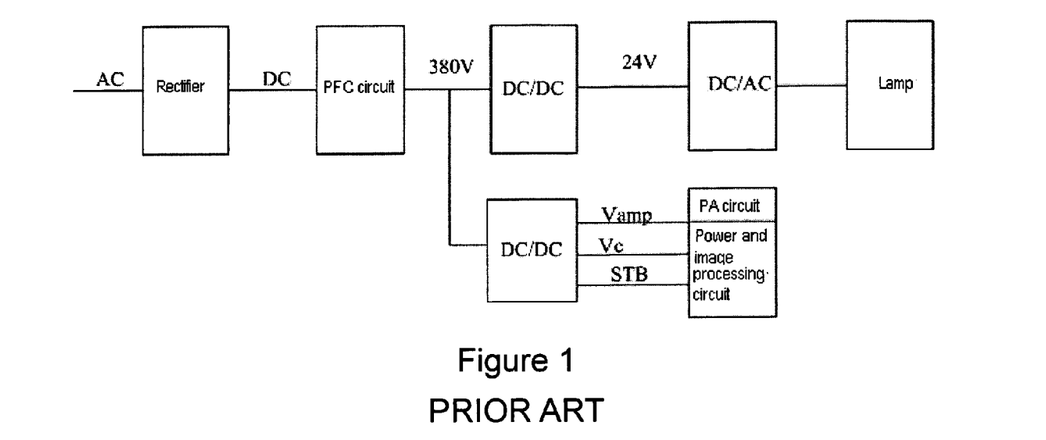
FIG. 1 shows a schematic diagram of existing LCD power circuit.

In present application, the fluorescent lamp driver power and the power of the control system are totally different from and independent of each other, as shown in FIG. 1. In some cases where the LCD is used, for example, in the application of "Two-in-One" power of the liquid crystal TV, apart from providing high-voltage AC for the lamp tubes in the backlight module, you also need to provide an isolated low-voltage DC for the control & image processing circuits and power amplifier circuits in the liquid crystal panel. And this low-voltage DC is called the "Control Power". As shown in FIG. 1, the AC is converted into stable 24V DC before sent to converter, so the energy undergoes transformation twice from the output of PFC circuit to the lamp, and moreover, an independent "Control Power" transformer is required, resulting in the following disadvantages:

(a) Multiple energy transformations.
(b) Low working efficiency.
(c) High cost due to the complexity of circuits.
(d) High failure rate.

SUMMARY OF THE PRESENT INVENTION

The technical issue to be addressed in this invention is to provide a type of fluorescent lamp driver power that integrates the control power.

The following solution is adopted to address the above technical issue.

The present invention discloses a kind of fluorescent lamp driver power, which consists of the multi-switch converting circuit, power transformer, resonant inductor, resonant capacitor, step-up transformer and rectifier. It features the following:

(a) The PW of the power transformer connects with the AC output of multi-switch converting circuit.

(b) The resonant inductor and resonant capacitor, after series connection, connect to the SW of the power transformer through the PW of the step-up transformer.

(c) The SW of the power transformer connects with the rectifier.

(d) The SW of the step-up power transformer connects with the load output.

Wherein, the SW of the power transformer has at least two pairs of output lines. One pair of output lines connect in series with the resonant inductor, resonant capacitor and the PWs of the step-up transformer. Other output lines connect with the rectifier respectively.

Wherein, the SW of the power transformer has at least two SWs. One SW connects in series with the resonant inductor, resonant capacitor and the PWs of the step-up transformer. Other SWs connect with the rectifier respectively.

Wherein, there are at least two power transformers. The PWs of every power transformer connect with each other in parallel. The SWs of every power transformer, after series connection, connect with the resonant inductor, resonant capacitor and the PWs of the step-up transformer. The SWs of every power transformer, after series connection, also connect with the rectifier.

Wherein, there are at least two power transformers. The PWs of every power transformer connect with each other in parallel. The SWs of one power transformer connect in series with the resonant inductor, resonant capacitor and the PWs of the step-up transformer. The SWs of other power transformers connect with the rectifier respectively.

Wherein, there are at least two power transformers. The PWs of every power transformer connect with each other in parallel. The SW of the power transformer has at least two pairs of output lines. One pair of output lines of each SW, after series connection, connect in series with the resonant inductor, resonant capacitor and the PWs of the step-up transformer. Other pairs of output lines of each SW connect with the rectifier respectively.

Wherein, there are at least two power transformers. The PWs of every power transformer connect with each other in parallel. Each power transformer has at least two SWs. The SWs of the one or more power transformers, after direct or series connection, connect in series with the resonant inductor, resonant capacitor and the PWs of the step-up transformer. The SWs of other power transformers connect with the rectifier after direct or series connection.

Wherein, the PFC circuit is included, and it outputs high-voltage DC to the input of the multi-switch converting switch.

Wherein, at least two step-up transformers are included, and the PWs of every step-up transformer are connected in parallel, and the SWs connect with the load output respectively.

Wherein, the rectifier is a full-bridge, full-wave or half-wave rectifier.

According to the above technical solution, this invention combines the fluorescent lamp driver power and the power supply of the control system, so that the energy transformation occurs only once for the output from the PFC circuit to lamp. By using this invention, the system cost is lowered greatly by saving two converters, working efficiency dramatically enhanced and system stability improved as well.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

In the following detailed description of embodiments of the invention, numerous specific details are set forth in order to provide a more thorough understanding of the invention with reference to the accompanying figures.

Figure 2:
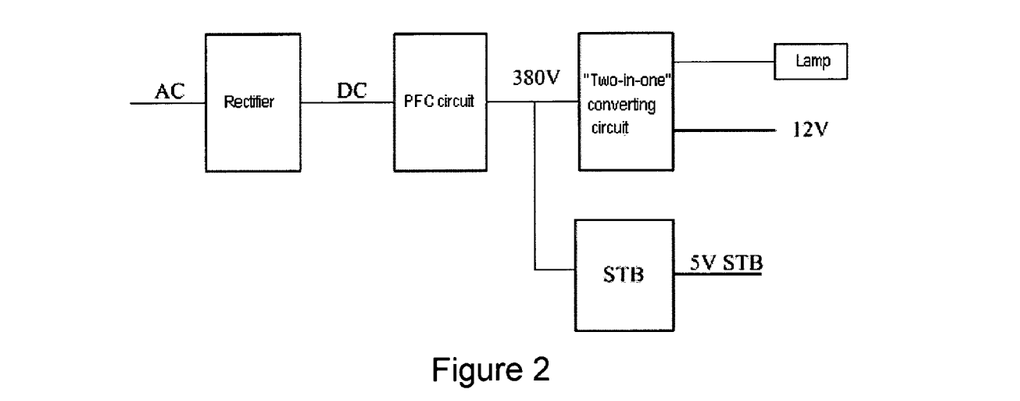
FIG. 2 shows a schematic block diagram of the power circuit of the invention.

FIG. 2 shows a schematic block diagram of the power circuit of the invention. The fluorescent lamp driver power and the power supply of the control system adopt a "Two-in-One" converting circuit. The SW of the power transformer connects with the PW of the step-up transformer through a resonant circuit. The SW of the step-up transformer connects with the fluorescent lamp to drive the lamp. The SW of the power transformer also connects with the rectifier to provide power supply for the control system. Therefore, the luminosity of the fluorescent lamp is adjustable through change of the switch frequency, and meantime the output of the control system power supply remains unchanging. The power circuit of the invention drives the fluorescent lamp and also provides a stable power supply for the control system.

Figure 3:
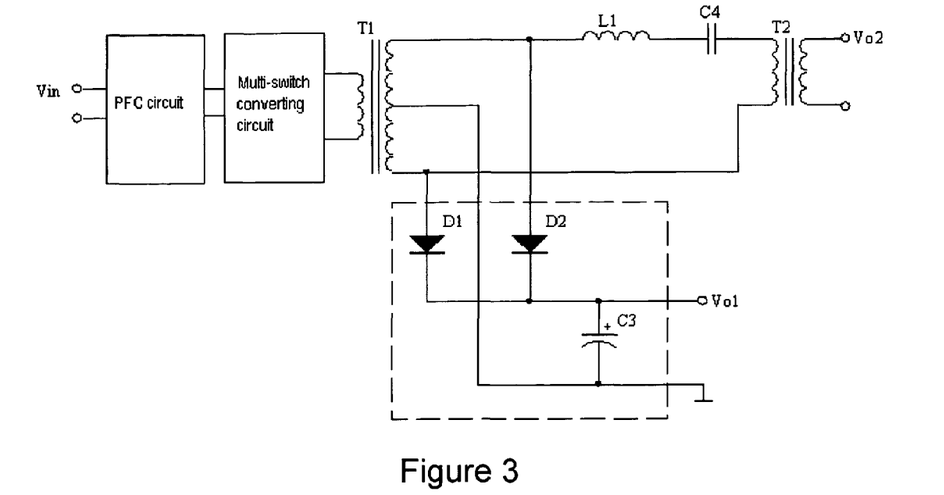
FIG. 3 shows a schematic diagram of the power circuit of the invention.

FIG. 3 shows a schematic diagram of the power circuit of the invention. This circuit includes the PFC circuit, multi-switch converting circuit in connection with the high-voltage DC output of the PFC circuit, power transformer (T1), step-up transformer (T2), rectifier and resonant circuit.

The PW of T1 connects with the AC output of the multi-switch convening circuit, and the SW of T1 connects with the PW of T2 through a resonant circuit. The resonant circuit is composed of the resonant inductor (L1) and resonant capacitor (C4) which are connected in series. The SW of T2 connects with the load output. The SW of T1 also connects with the rectifier to provide the power supply.

Figure 4:
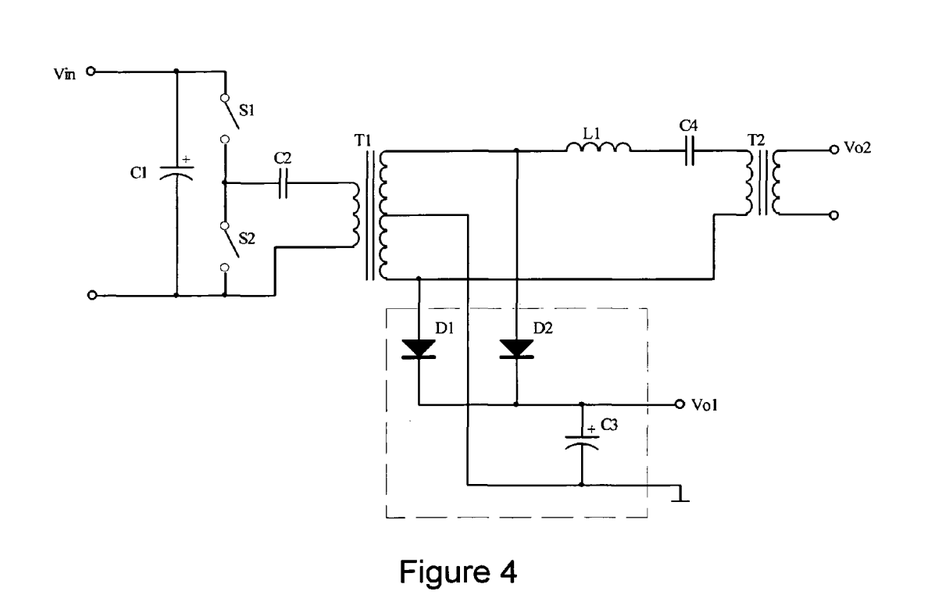
FIG. 4 shows a schematic diagram of the first embodiment of the invention.

FIG. 4 shows a schematic diagram of the first embodiment of the invention. This circuit includes the PFC circuit, multi-switch converting circuit in connection with the high-voltage DC output of the PFC circuit, T1, T2, rectifier, resonant circuit and blocking capacitor (C2).

The multi-switch converting circuit includes the first switch S1 and the second switch S2. S1 and S2, after series connection, connect with the PFC capacitor C1 in parallel at the input end Vin. One end of C2 connects with the midpoint of S1 and S2, and the other end connects with the Vin through the PW of T1.

The resonant circuit includes L1 and C4. L1 and C4, after series connection, connect with the SW of T1 through the PW of T2; the SW of T1 connects with the rectifier; the SW of T2 connects with the load output.

Wherein, the rectifier is a half-wave, full-wave or full-bridge rectifier, and the multi-switch converting circuit is a half-bridge or full-bridge circuit topology.

Figure 5:
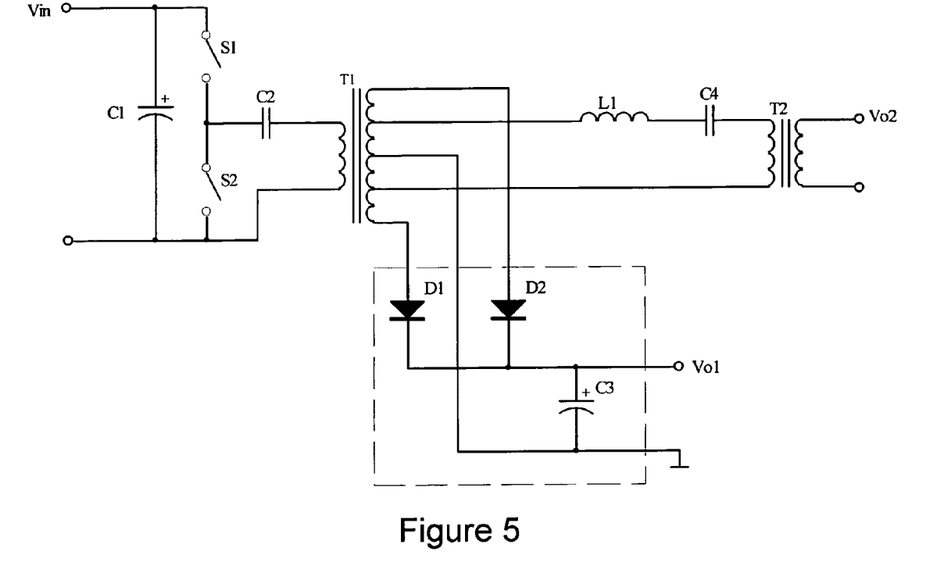
FIG. 5 shows a schematic diagram of the second embodiment of the invention.

Similar to the schematic diagram of the first embodiment of the invention. FIG. 5 shows the schematic diagram of the second embodiment of the invention. The SW of the T1 has several output lines. But the difference between FIG. 4 and FIG. 5 lies in the connection between the SW output of T1 and the rectifier & resonant circuit. The second embodiment has all advantages of the first one.

Figure 6:
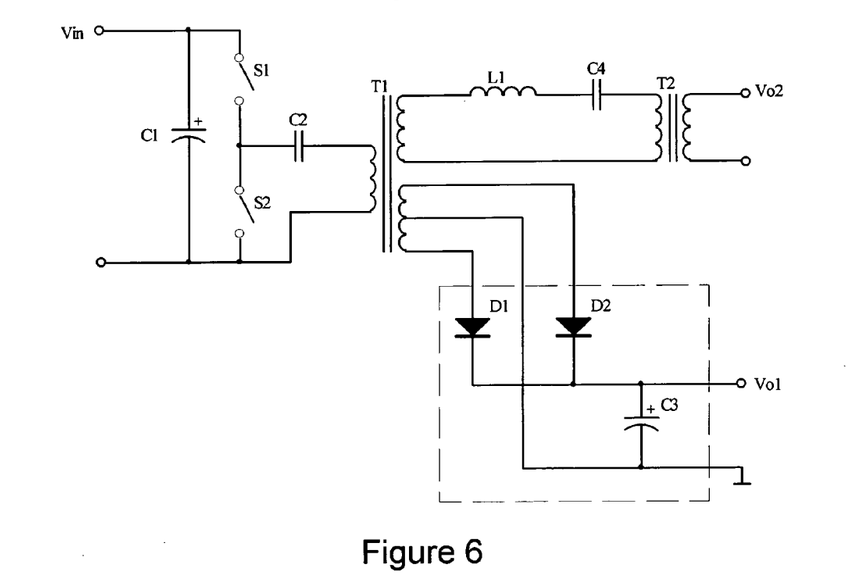
FIG. 6 shows a schematic diagram of the third embodiment of the invention.

FIG. 6 is similar to the schematic diagrams of the first and second embodiments, with the difference as follows:

The T1 has several SWs, one of which connects with the resonant circuit and T2 in serier, the others connecting to the output of rectifier respectively.

The third embodiment has all advantages of the second one.

Figures 7, 8:
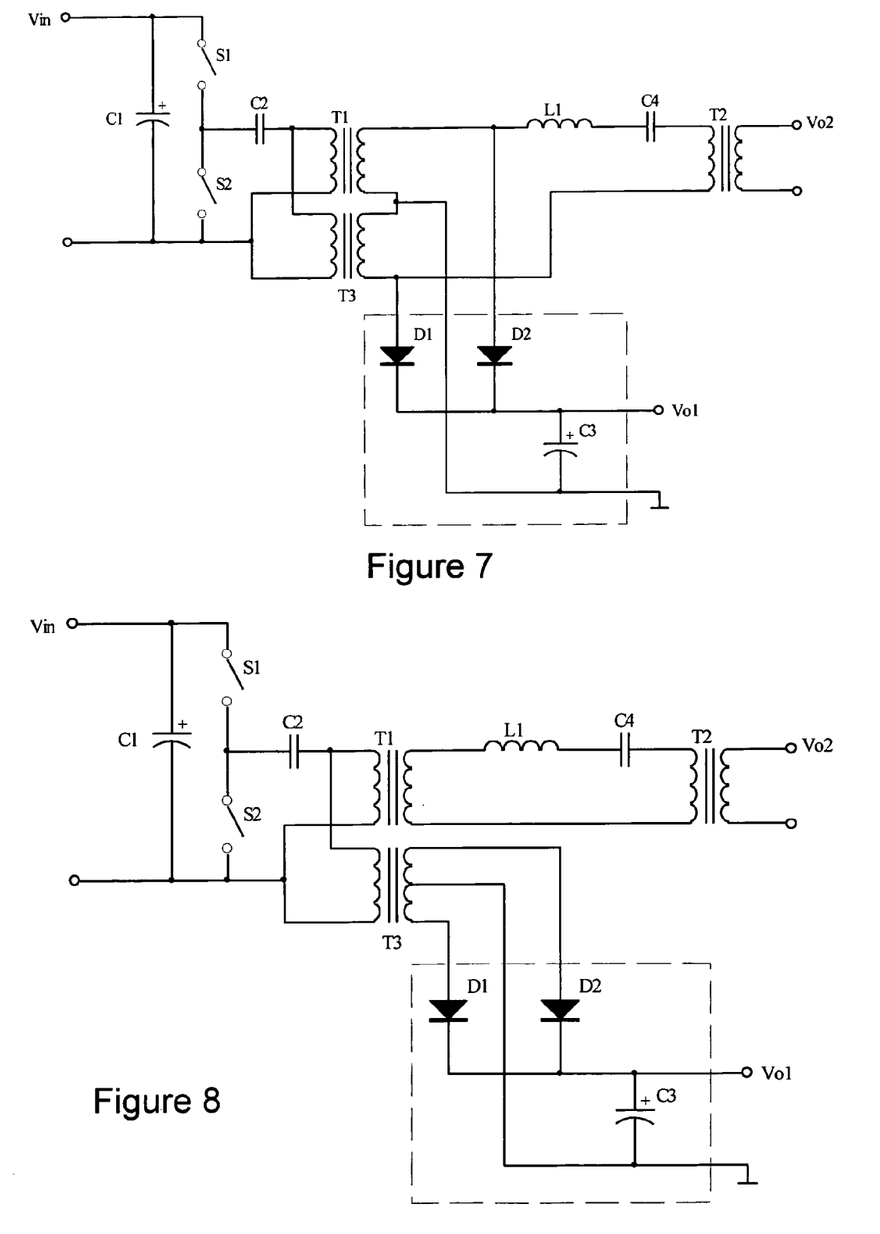
FIG. 7 shows a schematic diagram of the fourth embodiment of the invention.
FIG. 8 shows a schematic diagram of the fifth embodiment of the invention.

FIG. 7 is similar to the schematic diagram of the third embodiment, with the differences as follows:

Several transformers are adopted.

The PWs of every power transformer connect with each other in parallel.

The SWs of every power transformer, after series connection, connect with the resonant circuit and the PWs of T2.

The SWs of every power transformer, after series connection, also connect with the rectifier.

The fourth embodiment has all advantages of the third one.

FIG. 8 is similar to the schematic diagram of the fourth embodiment, with the differences as follows:

One of SWs of the power transformers connect with the PWs of the resonant circuit and T2.

Other SWs respectively connect with the rectifier output.

The fifth embodiment has all advantages of the fourth one.

Figure 9:
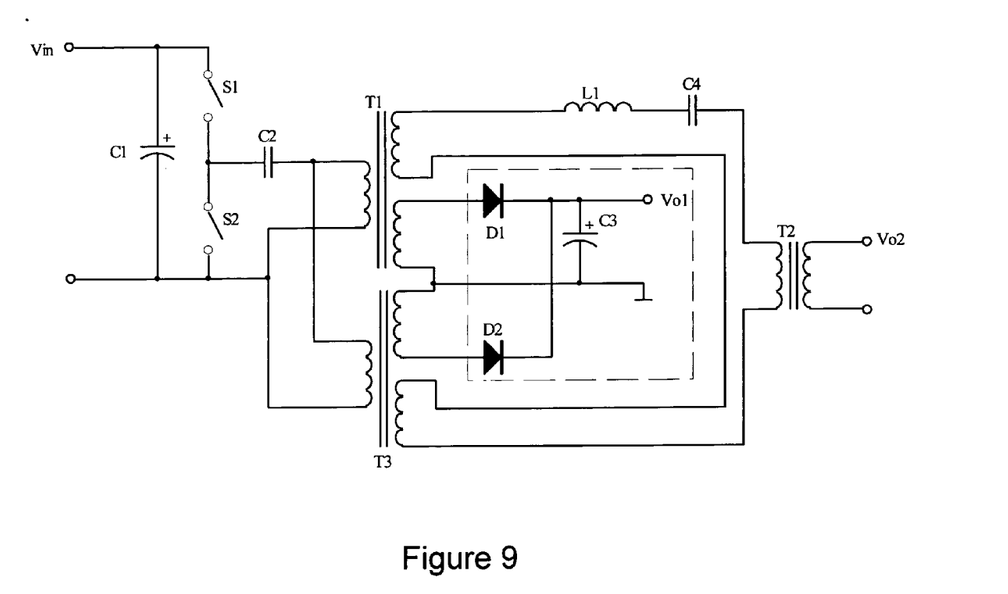
FIG. 9 shows a schematic diagram of the sixth embodiment of the invention.

FIG. 9 is similar to the schematic diagram of the fifth embodiment, with the differences as follows:

Each power transformer has several SWs. One or several of the SWs, after connected directly or in series, connect with the resonant circuit and the PWs of T2 in series.

The rest SWs, after connected directly or in series, respectively connect with the rectifier output.

The sixth embodiment has all advantages of the fifth one.

Figure 10:
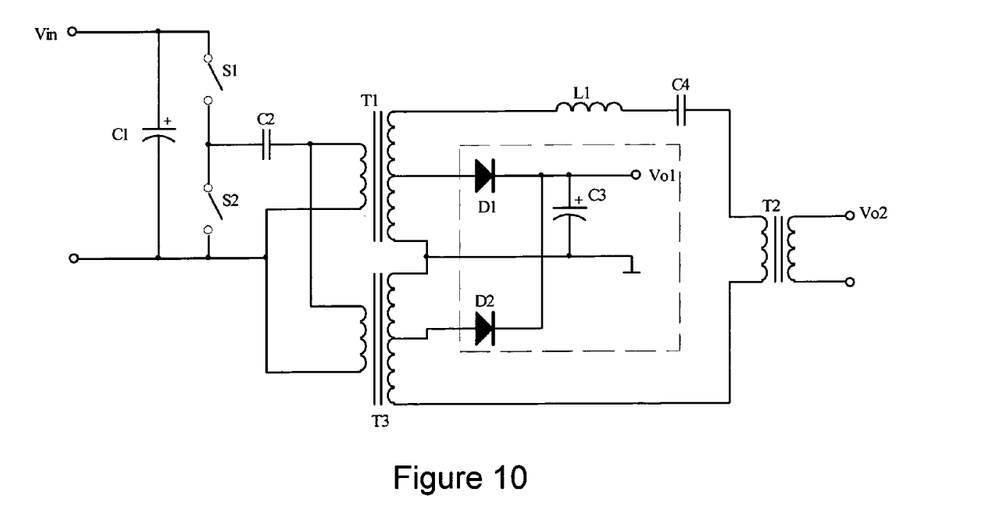
FIG. 10 shows a schematic diagram of the seventh embodiment of the invention.

FIG. 10 is similar to the schematic diagram of the fifth embodiment, with the differences as follows:

The SWs of every power transformer, after series connection, connect with the resonant circuit and the PWs of T2 in series.

The SWs of every power transformer, after series connection, also connect with the rectifier output.

The seventh embodiment has all advantages of the fifth one.

In addition, this invention allows you to configure several step-up transformers as required to form multi-output and lower cost as well.

The operational principle of other embodiments is similar to that of FIG. 4, a typical embodiment in this invention. Therefore, the following takes FIG. 4 as an example to illustrate the operational principle of this invention.

In FIG. 4,

Vin refers to the output of PFC circuit, which generally ranges from 380 to 400V. The voltage is stable, with a controllable precision of ±3%.

T1 is a nearly ideal transformer, and it's turns ratio is N.

When the half-bridge circuit works at a duty ratio of 50%, the rectifier output voltage Vo is approximately:

$$Vo \approx Vin/2N$$

The half-bridge circuit works at variable frequencies and the duty ratio 50% remains unchanged, so the value of Vo does not change, with its stability contingent upon Vin. The precision of Vo can be controlled within ±5% because Vin has a controllable precision of ±3%.

Figure 11:
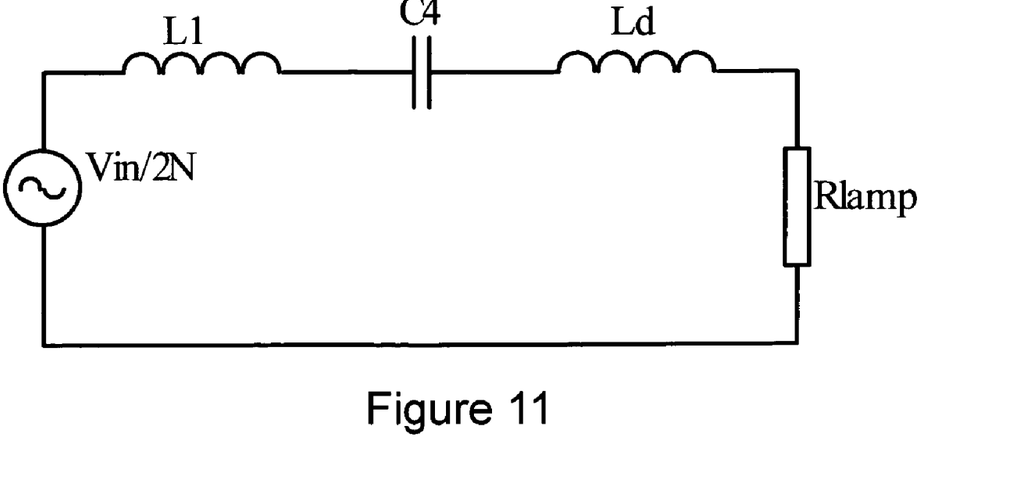
FIG. 11 shows an equivalent circuit diagram for the circuit in FIG. 4.

FIG. 11 shows an equivalent circuit diagram for the circuit in FIG. 4. If the equivalent leakage inductance of T2 in FIG. 4 is Ld, then the resonant frequency of the circuit fr is:

$$fr = 1/2\pi\sqrt{C4(L1+Ld)}$$

Figure 12:
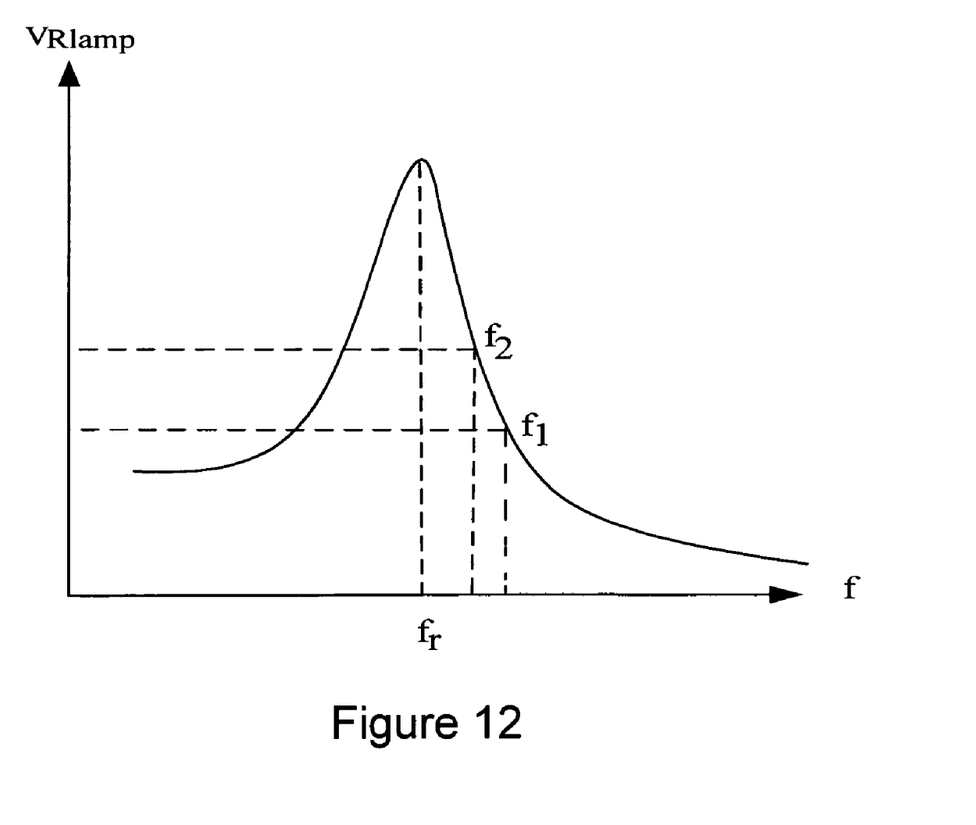
FIG. 12 shows a diagram of frequency relation between the voltage and excitation power supply of the lamp.

FIG. 12 shows the frequency relation between the voltage of lamp load Rlamp and excitation power Vin/2N. When f1 goes up to f2, the voltage of Rlamp increases. Therefore, the luminosity of the lamp can be changed by adjusting the frequency. When adjusting the frequency, select a working frequency higher than the resonant frequency fr so that the power switch of the half-bridge circuit shown in FIG. 4 works in the zero-voltage switching state, lowering the switching loss of the power switch.

The above details a type of fluorescent lamp driver power presented in this invention. This document elaborates on the operational principle and embodiments of the invention with reference to a specific embodiment. The above embodiments are only used to help understand the methods and core concept of this invention. Various modifications and applications will readily occur to those skilled in the art and may be employed, as suitable, without departing from the true spirit of the invention. Therefore, it is to be understood that the contents in this document shall by no means be construed as a limitation of this invention.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A fluorescent lamp driver for providing optimal voltage output to a control system and a florescent lamp of a Liquid Crystal Display (LCD), comprising:
   a multi-switch converting circuit having an input and an AC output;
   a Power Factor Correction (PFC) circuit which outputs a high-voltage direct current to said input of said of said multi-switch converting circuit;
   a resonant circuit having a resonant inductor and a resonant capacitor;
   a power transformer having a primary winding and a secondary winding having a first and second output lines and a third output line between said first and second output lines, wherein said primary winding of said power transformer is connected with said AC output of said multi-switch converting circuit;
   a resonant circuit connected with said secondary winding of said power transformer, wherein said resonant circuit comprises a resonant inductor and a resonant capacitor connected with said resonant inductor in series;
   a step-up transformer connected in parallel with said power transformer, wherein said step-up transformer has a primary winding connected with said first and second output lines of said secondary winding of said power transformer, said resonant inductor and said resonant capacitor in series, and a secondary winding connected with said fluorescent lamp as a voltage output thereof; and
   a rectifying circuit, which is connected with said secondary winding of said power transformer, comprising a first diode, a second diode and an auxiliary capacitor, wherein said auxiliary capacitor, which is connected with an output of said rectifying circuit for providing optimal voltage output to said control system, has a first end connected to said third output line of said secondary winding of said power transformer and a second end connected to said first and second output lines of said secondary winding of said power transformer, wherein said first diode is connected between said second output line of said secondary winding of said power transformer and said second end of said auxiliary capacitor, wherein said second diode is connected between said first output line of said secondary winding of said power transformer and said second end of said auxiliary capacitor.

2. The fluorescent lamp driver, as recited in claim 1, wherein said multi-switch converting circuit includes a first switch and a second switch which are connected in series and connected with a PFC capacitor of said PFC circuit in parallel at an input end thereof, wherein said multi-switch converting circuit further comprises a blocking capacitor having one end connected with a point between said first and second switches and another end connected with said primary winding of said power transformer in series.

3. A fluorescent lamp driver for providing optimal voltage output to a control system and a florescent lamp of a Liquid Crystal Display (LCD), comprising:
   a multi-switch converting circuit having an input and an AC output;
   a Power Factor Correction (PFC) circuit which outputs a high-voltage direct current to said input of said of said multi-switch converting circuit;
   a resonant circuit having a resonant inductor and a resonant capacitor;
   a power transformer having a primary winding and a secondary winding having a first, second, third, fourth, and fifth output lines, wherein said primary winding of said power transformer is connected with said AC output of said multi-switch converting circuit;
   a resonant circuit connected with said secondary winding of said power transformer, wherein said resonant circuit comprises a resonant inductor and a resonant capacitor connected with said resonant inductor in series;
   a step-up transformer connected in parallel with said power transformer, wherein said step-up transformer has a primary winding connected with said first and second output lines of said secondary winding of said power transformer, said resonant inductor and said resonant capacitor in series, and a secondary winding connected with said fluorescent lamp as a voltage output thereof; and
   a rectifying circuit, which is connected with said secondary winding of said power transformer, comprising a first diode, a second diode and an auxiliary capacitor, wherein said auxiliary capacitor, which is connected with an output of said rectifying circuit for providing optimal voltage output to said control system, has a first end connected to said third output line of said secondary winding of said power transformer and a second end connected to said fourth and fifth output lines of said secondary winding of said power transformer, wherein said first diode is connected between said fifth output line of said secondary winding of said power transformer and said second end of said auxiliary capacitor, wherein said second diode is connected between said fourth output line of said secondary winding of said power transformer and said second end of said auxiliary capacitor.

4. The fluorescent lamp driver, as recited in claim 3, wherein said multi-switch converting circuit includes a first switch and a second switch which are connected in series and connected with a PFC capacitor of said PFC circuit in parallel at an input end thereof, wherein said multi-switch converting circuit further comprises a blocking capacitor having one end connected with a point between said first and second switches and another end connected with said primary winding of said power transformer in series.

5. A fluorescent lamp driver for providing optimal voltage output to a control system and a florescent lamp of a Liquid Crystal Display (LCD), comprising:
a multi-switch converting circuit having an input and an AC output;
a Power Factor Correction (PFC) circuit which outputs a high-voltage direct current to said input of said of said multi-switch converting circuit;
a resonant circuit having a resonant inductor and a resonant capacitor;
a power transformer having a primary winding and a first and second secondary windings, wherein said first secondary winding has a first and a second output lines and said second secondary winding has a third, fourth and fifth output lines, wherein said primary winding of said power transformer is connected with said AC output of said multi-switch converting circuit;
a resonant circuit connected with said secondary winding of said power transformer, wherein said resonant circuit comprises a resonant inductor and a resonant capacitor connected with said resonant inductor in series;
a step-up transformer connected in parallel with said power transformer, wherein said step-up transformer has a primary winding connected with said first and second output lines of said first secondary winding of said power transformer, said resonant inductor and said resonant capacitor in series, and a secondary winding connected with said fluorescent lamp as a voltage output thereof; and
a rectifying circuit, which is connected with said secondary winding of said power transformer, comprising a first diode, a second diode and an auxiliary capacitor, wherein said auxiliary capacitor, which is connected with an output of said rectifying circuit for providing optimal voltage output to said control system, has a first end connected to said fourth output line of said second secondary winding of said power transformer and a second end connected to said fourth and fifth output lines of said second secondary winding of said power transformer, wherein said first diode is connected between said fifth output line of said secondary winding of said power transformer and said second end of said auxiliary capacitor, wherein said second diode is connected between said fourth output line of said secondary winding of said power transformer and said second end of said auxiliary capacitor.

6. The fluorescent lamp driver, as recited in claim 3, wherein said multi-switch converting circuit includes a first switch and a second switch which are connected in series and connected with a PFC capacitor of said PFC circuit in parallel at an input end thereof, wherein said multi-switch converting circuit further comprises a blocking capacitor having one end connected with a point between said first and second switches and another end connected with said primary winding of said power transformer in series.

7. A fluorescent lamp driver for providing optimal voltage output to a control system and a florescent lamp of a Liquid Crystal Display (LCD), comprising:
a Power Factor Correction (PFC) circuit having a PFC capacitor;
a multi-switch converting circuit having an input and an AC output, wherein said PFC circuit outputs a high-voltage direct current to said input of said of said multi-switch converting circuit, wherein said multi-switch converting circuit includes a first switch and a second switch which are connected in series and connected with said PFC capacitor of said PFC circuit in parallel at an input end thereof, wherein said multi-switch converting circuit further comprises a blocking capacitor;
a resonant circuit having a resonant inductor and a resonant capacitor;
a first and second power transformers each having a primary winding and secondary winding, wherein said secondary winding of said first power transformer has a first and a second output lines and said secondary winding of said second power transformer has a third and fourth output lines, wherein said primary windings of said first and second power transformer are connected with said AC output of said multi-switch converting circuit, wherein said blocking capacitor has one end connected with a point between said first and second switches and another end connected with one input line of each of said primary windings of said first and second power transformers while another input line of each of said primary windings of said first and second power transformers is connected to said second switch of said multi-switch converting circuit;
a resonant circuit connected with said secondary winding of said power transformer, wherein said resonant circuit comprises a resonant inductor and a resonant capacitor connected with said resonant inductor in series;
a step-up transformer connected in parallel with said first and second power transformers, wherein said step-up transformer has a primary winding connected with said first and fourth output lines of said secondary windings of said first and second power transformers, wherein said resonant inductor and said resonant capacitor are connected in series with said primary winding of said step-up transformer, wherein a secondary winding of said step-up transformer is connected with said fluorescent lamp as a voltage output thereof; and
a rectifying circuit, which is connected with said secondary windings of said first and second power transformers, comprising a first diode, a second diode and an auxiliary capacitor, wherein said auxiliary capacitor, which is connected with an output of said rectifying circuit for providing optimal voltage output to said control system, has a first end connected to said second output line and said third output line of said secondary windings of said first and second power transformers and a second end connected to said first output line and said fourth output line of said secondary windings of said first and second power transformers, wherein said first diode is connected between said fourth output line of said secondary winding of said second power transformer and said second end of said auxiliary capacitor, wherein said second diode is connected between said first output line of said secondary winding of said power transformer and said second end of said auxiliary capacitor.

8. A fluorescent lamp driver for providing optimal voltage output to a control system and a florescent lamp of a Liquid Crystal Display (LCD), comprising:
a Power Factor Correction (PFC) circuit having a PFC capacitor;
a multi-switch converting circuit having an input and an AC output, wherein said PFC circuit outputs a high-voltage direct current to said input of said of said multi-switch converting circuit, wherein said multi-switch converting circuit includes a first switch and a second switch which are connected in series and connected with said PFC capacitor of said PFC circuit in parallel at an input end thereof, wherein said multi-switch converting circuit further comprises a blocking capacitor;

a resonant circuit having a resonant inductor and a resonant capacitor;

a first and second power transformers each having a primary winding and secondary winding, wherein said secondary winding of said first power transformer has a first and a second output lines and said secondary winding of said second power transformer has a third and fourth output lines and a fifth output line between said third and fourth output lines, wherein said primary windings of said first and second power transformer are connected with said AC output of said multi-switch converting circuit, wherein said blocking capacitor has one end connected with a point between said first and second switches and another end connected with one input line of each of said primary windings of said first and second power transformers while another input line of each of said primary windings of said first and second power transformers is connected to said second switch of said multi-switch converting circuit; a resonant circuit connected with said secondary winding of said power transformer, wherein said resonant circuit comprises a resonant inductor and a resonant capacitor connected with said resonant inductor in series;

a step-up transformer connected in parallel with said first power transformer, wherein said step-up transformer has a primary winding connected with said first and second output lines of said secondary winding of said first power transformer, said resonant inductor and said resonant capacitor in series, and a secondary winding connected with said fluorescent lamp as a voltage output thereof; and a rectifying circuit, which is connected with said secondary winding of said second power transformer, comprising a first diode, a second diode and an auxiliary capacitor, wherein said auxiliary capacitor, which is connected with an output of said rectifying circuit for providing optimal voltage output to said control system, has a first end connected to said fifth output line of said secondary winding of said second power transformer and a second end connected to said third output line and said fourth output line of said secondary winding of said second power transformer, wherein said first diode is connected between said fourth output line of said secondary winding of said second power transformer and said second end of said auxiliary capacitor, wherein said second diode is connected between said third output line of said secondary winding of said second power transformer and said second end of said auxiliary capacitor.

9. A fluorescent lamp driver for providing optimal voltage output to a control system and a florescent lamp of a Liquid Crystal Display (LCD), comprising:

a Power Factor Correction (PFC) circuit having a PFC capacitor;

a multi-switch converting circuit having an input and an AC output, wherein said PFC circuit outputs a high-voltage direct current to said input of said of said multi-switch converting circuit, wherein said multi-switch converting circuit includes a first switch and a second switch which are connected in series and connected with said PFC capacitor of said PFC circuit in parallel at an input end thereof, wherein said multi-switch converting circuit further comprises a blocking capacitor;

a resonant circuit having a resonant inductor and a resonant capacitor;

a first and second power transformers each having a primary winding and two secondary windings, said first secondary winding of said first power transformer having a first and second output lines, said second secondary winding of said first power transformer having a third and fourth output lines, said first secondary winding of said second power transformer having a fifth and sixth output lines, said second secondary winding of said second power transformer having a seventh and eighth output lines, wherein said primary windings of said first and second power transformer are connected with said AC output of said multi-switch converting circuit, wherein said blocking capacitor has one end connected with a point between said first and second switches and another end connected with one input line of each of said primary windings of said first and second power transformers while another input line of each of said primary windings of said first and second power transformers is connected to said second switch of said multi-switch converting circuit, wherein said second output line of said first secondary winding of said first power transformer is connected with said seventh output line of said second secondary winding of said second power transformer;

a resonant circuit connected with said first and second power transformers, wherein said resonant circuit comprises a resonant inductor and a resonant capacitor connected with said resonant inductor in series;

a step-up transformer connected in parallel with said first and second power transformers, wherein said step-up transformer has a secondary winding connected with said fluorescent lamp as a voltage output thereof and a primary winding connected with said first output line of said first secondary winding of said first power transformer and eighth output line of said second secondary winding of said second power transformer, wherein said resonant inductor and said resonant capacitor are connected with said primary winding of said step-up transformer in series; and a rectifying circuit, which is connected with said first and second power transformers, comprising a first diode, a second diode and an auxiliary capacitor, wherein said auxiliary capacitor, which is connected with an output of said rectifying circuit for providing optimal voltage output to said control system, has a first end connected to said fourth output line of said second secondary winding of said first power transformer and said fifth output line of said first secondary winding of said second power transformer and a second end connected to said second output line of said second secondary winding of said first power transformer and said sixth output line of said first secondary winding of said second power transformer, wherein said first diode is connected between said third output line of said second secondary winding of said first power transformer and said second end of said auxiliary capacitor, wherein said second diode is connected between said sixth output line of said first secondary winding of said second power transformer and said second end of said auxiliary capacitor.

10. A fluorescent lamp driver for providing optimal voltage output to a control system and a florescent lamp of a Liquid Crystal Display (LCD), comprising:

a Power Factor Correction (PFC) circuit having a PFC capacitor;

a multi-switch converting circuit having an input and an AC output, wherein said PFC circuit outputs a high-voltage direct current to said input of said of said multi-switch converting circuit, wherein said multi-switch converting circuit includes a first switch and a second switch which are connected in series and connected with said PFC capacitor of said PFC circuit in parallel at an input end thereof, wherein said multi-switch converting circuit further comprises a blocking capacitor;

a resonant circuit having a resonant inductor and a resonant capacitor;

a first and second power transformers each having a primary winding and a secondary winding, said secondary winding of said first power transformer having a first and second output lines and a third output line between said first and second output lines, said secondary winding of said second power transformer having a fourth and fifth output lines and a sixth output line between said fourth and fifth output lines, wherein said primary windings of said first and second power transformer are connected with said AC output of said multi-switch converting circuit, wherein said blocking capacitor has one end connected with a point between said first and second switches and another end connected with one input line of each of said primary windings of said first and second power transformers while another input line of each of said primary windings of said first and second power transformers is connected to said second switch of said multi-switch converting circuit;

a resonant circuit connected with said first and second power transformers, wherein said resonant circuit comprises a resonant inductor and a resonant capacitor connected with said resonant inductor in series;

a step-up transformer connected in parallel with said first and second power transformers, wherein said step-up transformer has a secondary winding connected with said fluorescent lamp as a voltage output thereof and a primary winding connected with said first output line of said secondary winding of said first power transformer and fifth output line of said secondary winding of said second power transformer, wherein said resonant inductor and said resonant capacitor are connected with said primary winding of said step-up transformer in series; and a rectifying circuit, which is connected with said first and second power transformers, comprising a first diode, a second diode and an auxiliary capacitor, wherein said auxiliary capacitor, which is connected with an output of said rectifying circuit for providing optimal voltage output to said control system, has a first end connected to said second output line of said secondary winding of said first power transformer and said fourth output line of said secondary winding of said second power transformer and a second end connected to said third output line of said secondary winding of said first power transformer and said sixth output line of said secondary winding of said second power transformer, wherein said first diode is connected between said third output line of said secondary winding of said first power transformer and said second end of said auxiliary capacitor, wherein said second diode is connected between said sixth output line of said secondary winding of said second power transformer and said second end of said auxiliary capacitor.

* * * * *